EXPANDABLE PRINTED CIRCUIT CROSSPOINT SWITCHING NETWORK

Filed March 25, 1963 5 Sheets-Sheet 1

INVENTOR.
T. L. BOWERS

BY [signature]

ATTORNEY

Dec. 13, 1966 T. L. BOWERS 3,291,914

EXPANDABLE PRINTED CIRCUIT CROSSPOINT SWITCHING NETWORK

Filed March 25, 1963 5 Sheets-Sheet 2

EXPANDABLE PRINTED CIRCUIT CROSSPOINT SWITCHING NETWORK

Filed March 25, 1963 5 Sheets-Sheet 4

3,291,914
EXPANDABLE PRINTED CIRCUIT CROSSPOINT SWITCHING NETWORK

Theron L. Bowers, Western Springs, Ill., assignor to International Telephone and Telegraph Corporation, a corporation of Maryland

Filed Mar. 25, 1963, Ser. No. 267,616
16 Claims. (Cl. 179—18)

This invention relates to electrical switching networks and more particularly to switching networks originally installed with a minimum number of crosspoints and having the ability to grow in switching capacity with growth occurring at an approximately linear cost per added network inlet.

A "switching network" is a device for selectively extending electrical paths from any inlet to any outlet. Each path is extended through the network by way of a number of switching contact sets commonly called "crosspoints." Since these crosspoints are the most numerous items in the switching network, crosspoint minimization offers a very fertile field for cost reduction. Unfortunately, however, it has not heretofore been possible to install a minimum crosspoint systm which could be economically enlarged by small additions while maintaining crosspoint minimization and the original basic configuration.

Traditionally, switching networks have used devices which do not permit practical crosspoint minimization. For example, to minimize crosspoints when using electromechanical switching components (such as a crossbar switch), very small switches and numerous switching stages may be required. Then, the number of magnets, plus the added control circuitry for multistage switching, become the controlling criteria of network cost; therefore, switches cannot economically be reduced to the small size desired. Moreover, it is not economically feasible to vary the capacity of switches after production tooling is acquired. Thus, except in large, multi-thousand line networks, a network designer is prevented from using a close approach to true crosspoint minimization.

With the advent of modern types of crosspoint and crosspoint matrices, the designer has been freed from the necessity for using large, inflexible standard-size switching units. For example, matrices employing glass-reed crosspoints may be made larger or smaller by the simple expedient of adding or subtracting crosspoints in any convenient geometrical pattern. In like manner, semiconductor crosspoints (such as PNPN diodes) may be assembled in matrices of any convenient pattern. In particular, recently developed electronic switching systems utilize semiconductor crosspoints having the ability to select their own required switching paths. This means that extensive in-network crosspoint controls are no longer required. Thus, the minimization of the required number of crosspoints becomes the basic criterion of network cost and the key to achieving maximum network cost reduction.

Accordingly, an object of this invention is to provide new and improved electrical switching networks. More particularly, an object is to provide any required size of network with a minimum number of crosspoints. In this connection, an object is to provide networks which can be increased in size to meet growth demands, at a nearly linear cost per added increment of line capacity.

Another object is to provide networks making full use of solid state crosspoint switching components. Here an object is to capitalize on network flexibility resulting from recent developments which have provided crosspoint arrays that have the ability to establish multistage paths on a self-seeking basis, thus eliminating the need for extensive in-network controls.

Still another object is to reduce the cost of switching networks by making full use of modern production techniques. For example, an object is to provide switching networks mounted on printed circuit cards with the crosspoints distributed over the cards in a manner such that uniform, linear cost, network growth occurs by the simple process of adding cards, as required. Here an object is to provide for growth in switching capacity without requiring a recabling of connections to and from network inlets and outlets to accomplish grading changes.

In accordance with one aspect of this invention, an electrical switching network utilizes a plurality of crosspoints distributed in full availability coordinate switching matrices. Each of the matrices includes a plurality of vertical and horizontal busses arranged with intersecting crosspoints. At each intersection are means (preferably a PNPN diode crosspoint) for opening or closing an electrical circuit between the busses intersecting at that crosspoint. Preferably there are three or more stages of cascaded matrices in the network, with single path inter-stage linking between each matrix and every matrix in the adjoining stage or stages. The grade of service of the network is calculated on an end-marking basis, to take into account the internal blocking of the switching network.

To make full use of modern production techniques, the crosspoints are not physically assembled into individual matrices. Rather, the crosspoints are distributed over printed circuit cards in a manner such that each card bearing an inlet also bears all network components required to serve that inlet. For example, if an inlet requires a particular number of primary and secondary matrix components, the printed circuit card that carries the inlet also carries all of those components. The intercard cabling extends from card to card in a manner such that all matrix components are brought together electrically, so as to eliminate all intrastage cabling, as well as large proportions of the interstage cabling. This way, the physical matrix construction is so related to the electrical matrix construction as to achieve an overall cost reduction.

The above mentioned and other objects and features of this invention and the manner of obtaining them will become more apparent, and the invention itself will be best understood by reference to the following description of an embodiment of the invention taken in conjunction with the accompanying drawings, in which.

Figures 1, 2A:
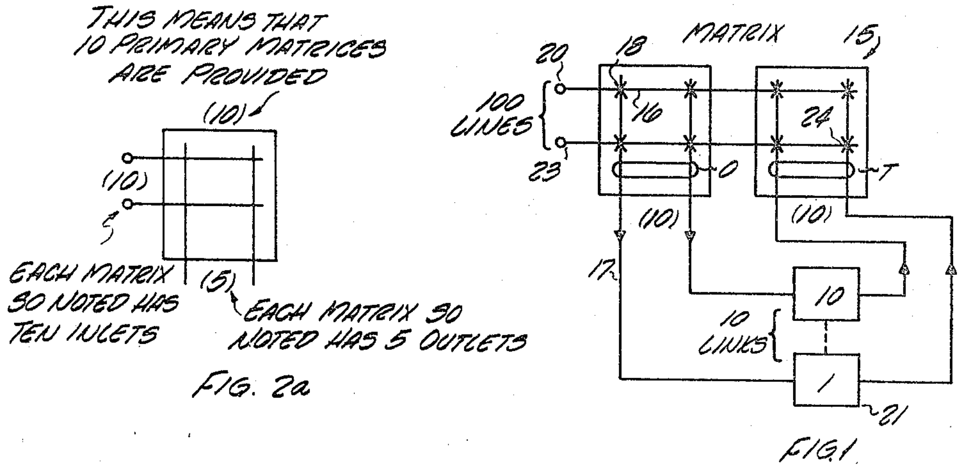
FIG. 1 shows an elementary matrix constructed with no effort to minimize the number of crosspoints—to illustrate the need for crosspoint minimization.
Figure 2:
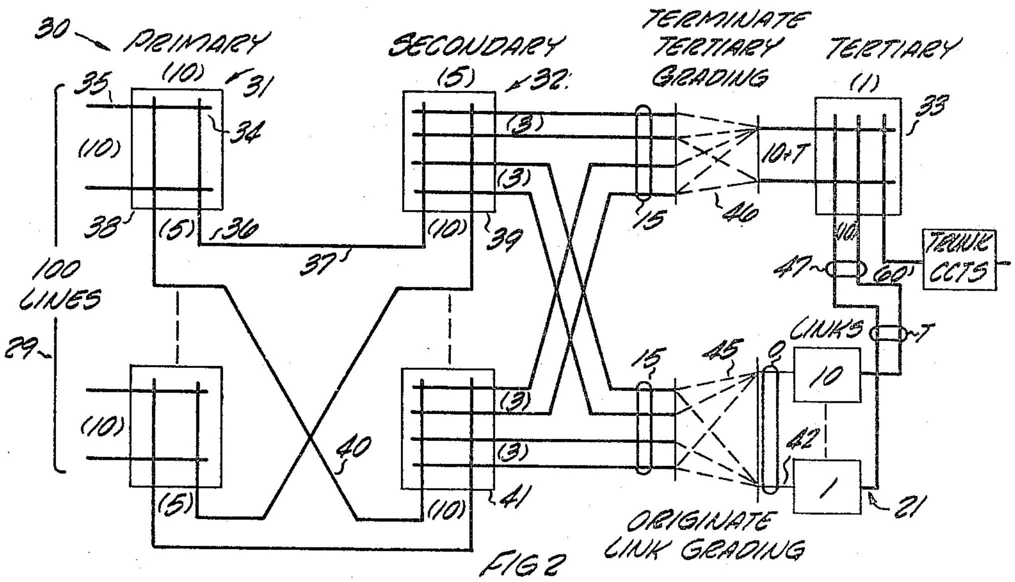
FIG. 2 is a diagram illustrating how a 100-line switching network may be assembled to provide a basic network building block.
Figure 3:
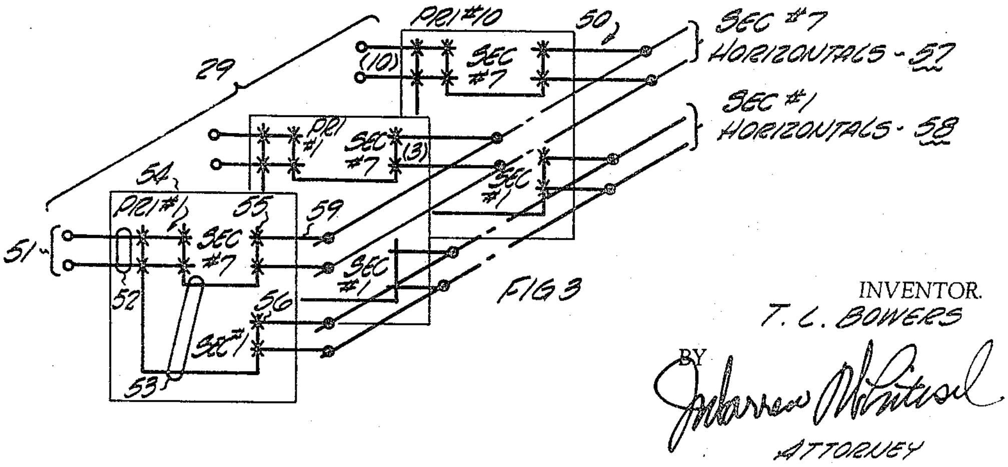
Figure 4:
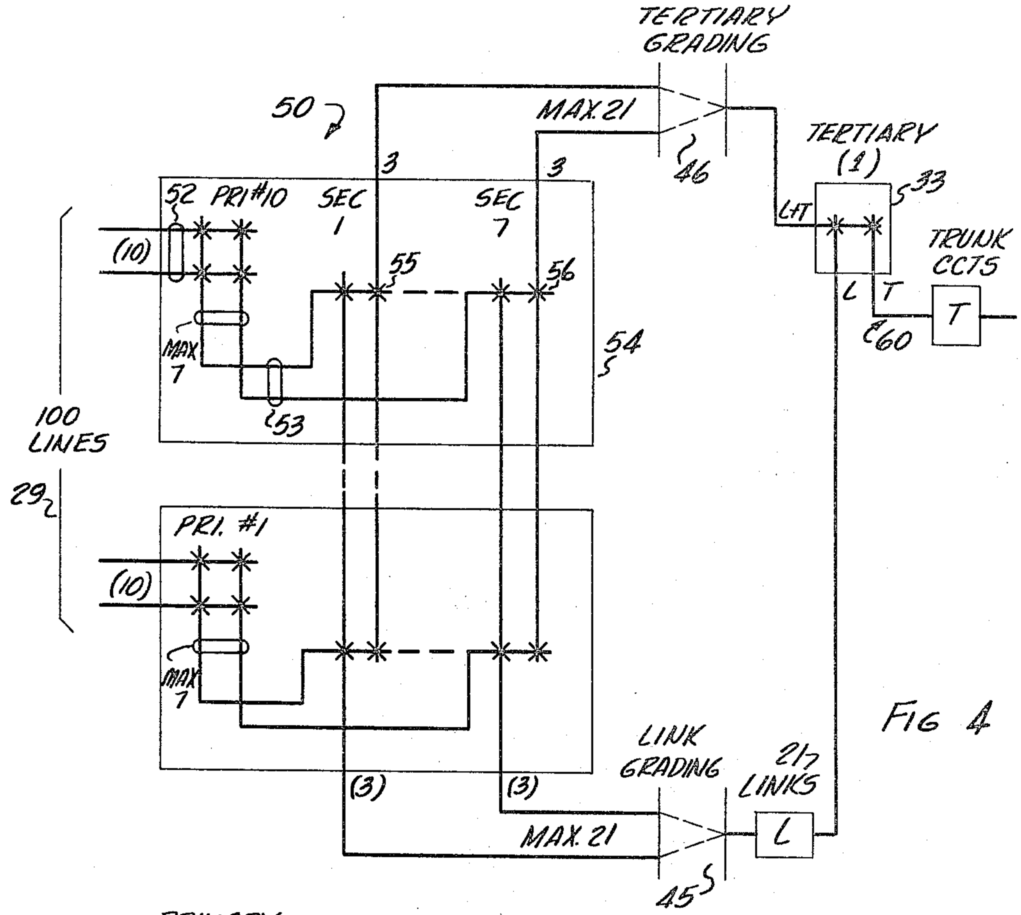
Figure 5:
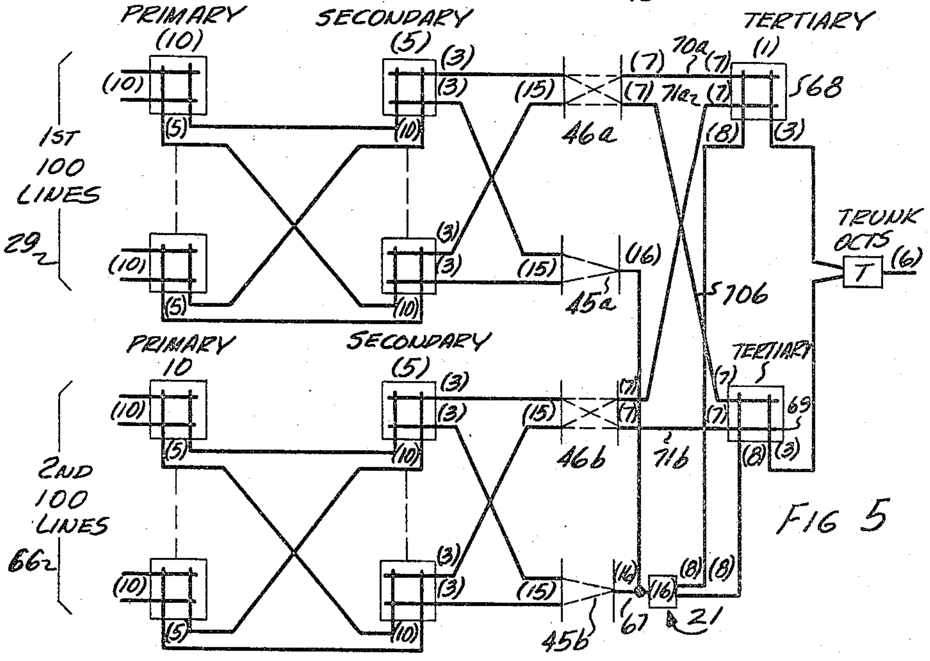
Figure 6:
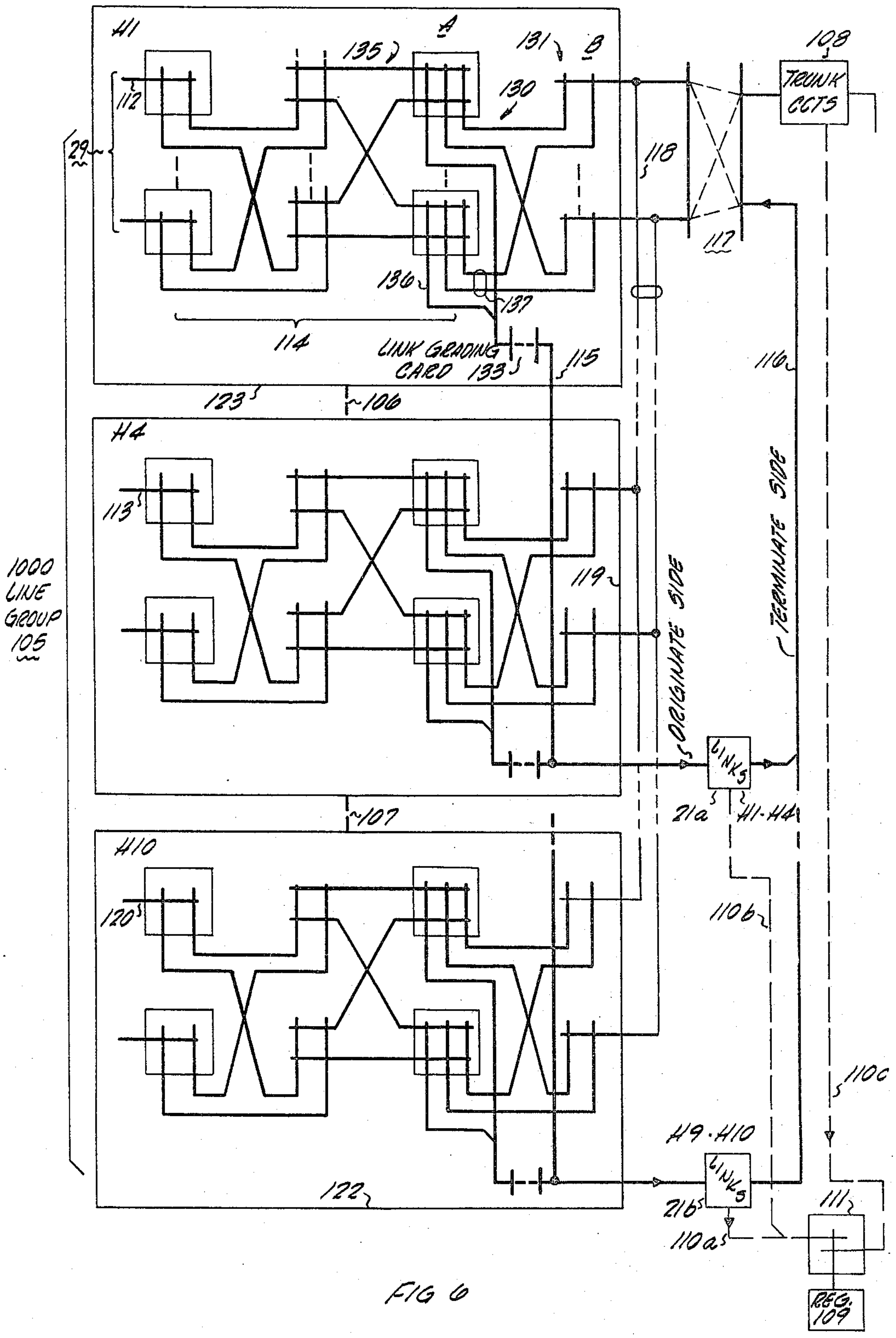
Figure 8:
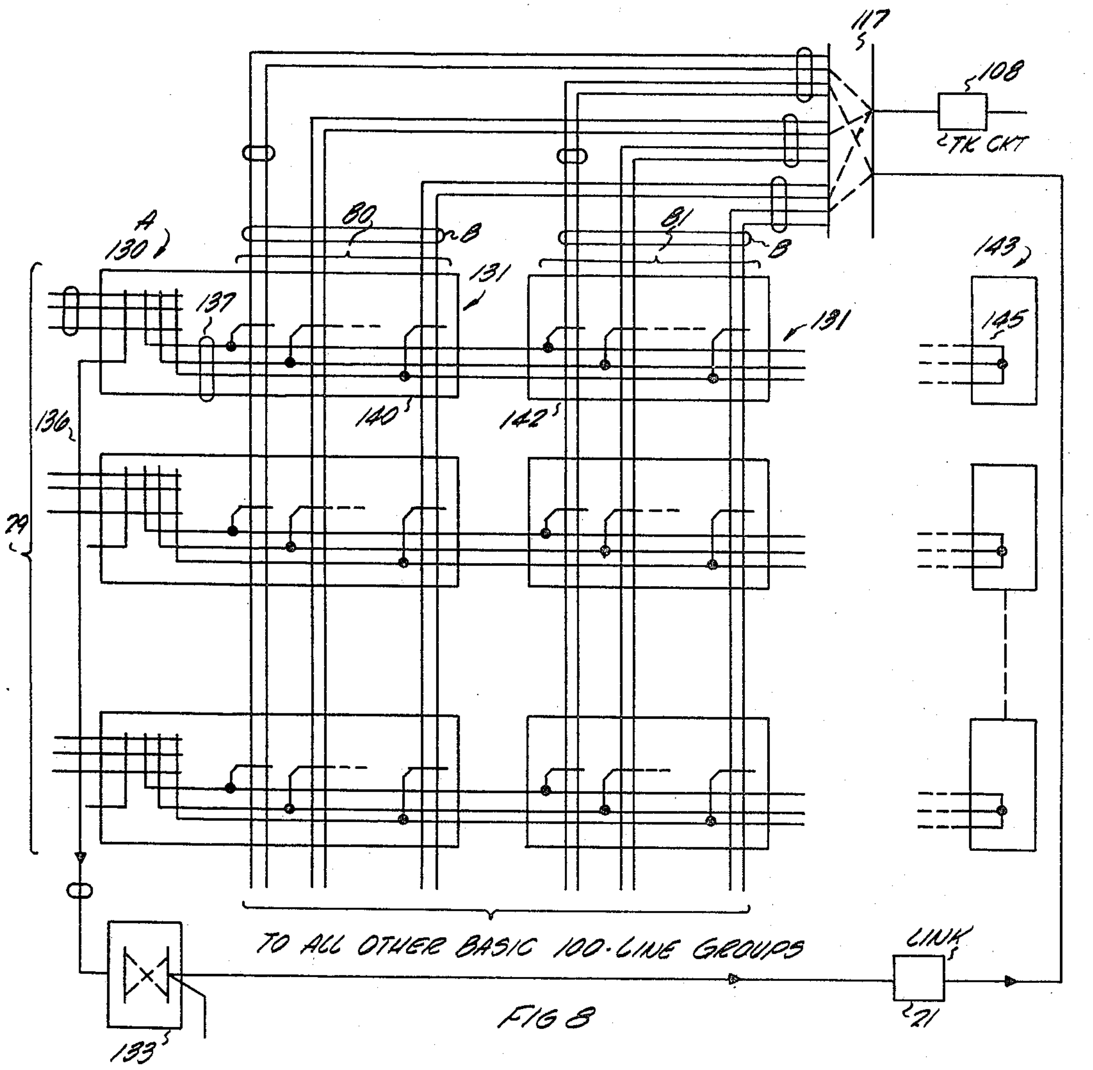
Figure 7:
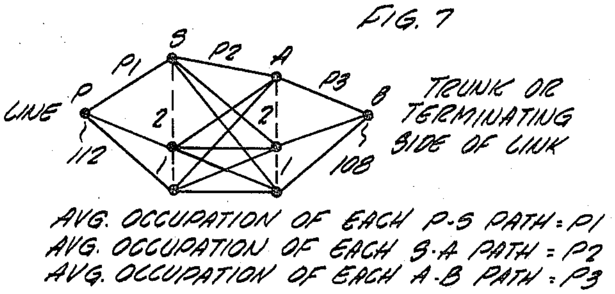
Figure 9:
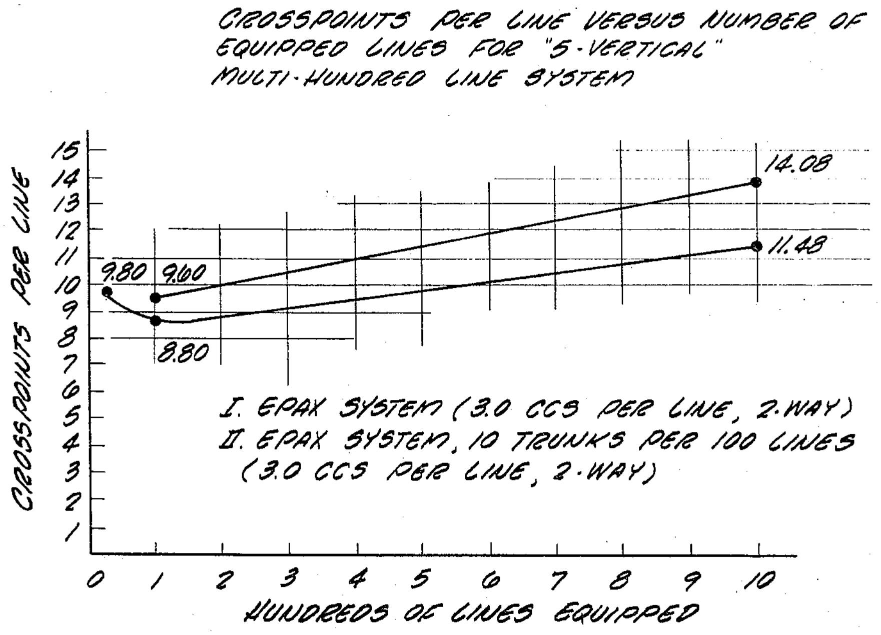
Figure 10:
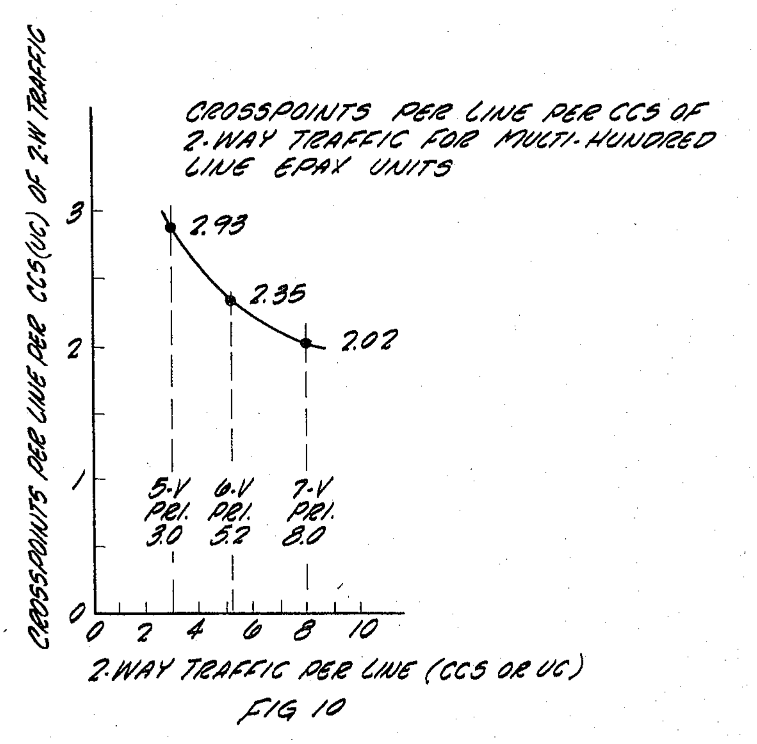

FIG. 2*a* explains the notation used elsewhere in the drawings;

FIG. 3 is a perspective showing of how the FIG. 2 network components are physically assembled on printed circuit cards, and then electrically joined to provide the desired matrix assemblages;

FIG. 4 is a schematic circuit diagram carrying the concept a step further to illustrate how links and trunks are added to the assemblage of FIG. 3;

FIG. 5 is a diagram showing how two of the basic 100-line networks are joined to provide a 200-line network;

FIG. 6 is a diagram showing how any number of the basic 100-line networks may be assembled to provide a multi-hundred line network;

FIG. 7 is a probability linear graph used for determining the matrix configuration for the multi-hundred line network of FIG. 6;

FIG. 8 is a plan view showing the physical distribution of crosspoints in the multi-hundred line network;

FIG. 9 is a graph showing how the number of crosspoints changes with respect to growth of a switching network; and FIG. 10 is a graph showing how the number of crosspoints changes with an increase of two-way traffic.

The following text describes switching networks having "lines" connected to their inlets and "links" connected to their outlets. Probably this terminology originated in the automatic telephony arts where the most numerous subscriber "lines" are selectively extended through swiching networks to the least numerous "links." The links then gave any service required by the lines, such as: dial tone, directory number data storage, call supervision, busy tone and the like. However, this use of "line" and "link" terminology should not be construed as a limitation on the invention.

BRIEF DESCRIPTION

It is thought that the fundamentals of the invention will be best understood if this description begins with a study of the simplest and most obvious switching network 15 (FIG. 1). That network comprises a plurality of horizontal and vertical busses (such as 16, 17) arranged in intersecting relation. At each intersection, such as 18, a crosspoint device either electrically isolates or electrically connects the intersecting busses, depending upon whether the crosspoint is opened or closed.

Here every line has originate access (O) to every link via an individual crosspoint. Thus, for example, line 20 has access to link 21 via the individual crosspoint 18. In like manner, every line has a terminate access (T) to every link, also via an individual crosspoint. Thus, line 23 may terminate on link 21 via an individual crosspoint 24. This way line 20 may connect to line 23 via crosspoint 18, link 21, and crosspoint 24.

The FIG. 1 network makes no effort to minimize crosspoints. Quite the contrary, it requires a maximum number of crosspoints. To illustrate, assume that there are 100 lines and 10 links. Each link has an originate access (O) and a terminate access (T) to give a total of 20 link access points. Thus, 100×20 or 2000 crosspoints—20 per line—are required for this rudimentary network. This 20 crosspoints per line is very extravagant.

"Traffic capacity" is a term used to indicate the volume of telephone calling activity which the network must be able to handle in the busy hour; it is directly related to the number of switch paths that must be able to be extended simultaneously through a network. As each available path is taken into use, it makes use of common equipment, such as a link, which then becomes unavailable to other equipment. Thus, in this assumed case (100 lines, 10 links), an all-paths busy condition occurs when 10 links are in simultaneous use serving 10 calls. If another line tries to use the network at this moment it encounters a busy signal and then must wait until one of the busy lines releases.

The traffic capacity is computed by known techniques, making use of the theory of probability for random call distributions to give a numerical value variously expressed in terms of "100-call-second" unit calls (UC) (also called CCS), or call-hours (Erlangs). For an elementary treatise on the use of these techniques see "Switching Systems," copyrighted 1961 by the American Telephone and Telegraph Company. Using traffic tables based upon these techniques, one finds that, for a 1:100 probability of blocking, the traffic capacity of the FIG. 1 network is approximately 150 CCS. From the standpoint of good electronic switching network design, this network is very extravagant in crosspoints for the grade of service provided. FIG. 2 shows an alternative network configuration which approximates closely the optimum in crosspoint minimization for a network capable of serving a group of one hundred lines 29 and 10 links 21, and handling a traffic load of 1.5 CCS per line of originating traffic at a 0.01 grade of service for both originating and terminating calls. A negligible concession has been made in crosspoint quantity, to enable the 100 lines to be grouped decimally on the primary matrices 31.

Three stages of switching matrices are employed, two of which are used in connecting calling lines to links. All three stages are utilized for extending a called line through the network to the terminating end of the calling line's link. The use of PNPN crosspoints is assumed in the description below.

In accordance with the invention, a three stage electrical switching network 30 is shown in FIG. 2 as formed by a plurality of cascaded stages 31, 32, 33. The notation associated in the drawing with each stage is explained in FIG. 2*a*. That is, in one stage [primary matrix 31 (for example)] there are 10 primary matrices, each having 10 inlets and 5 outlets; or, 10×10×5=500 crosspoints.

Each stage is an assemblage of crosspoints arranged so that there is one switching point in every possible path between each of the inlets and outlets of the stage. For example, the one crosspoint 34 is in the path between the horizontal inlet 35 and the vertical outlet 36. In like manner, there is a crosspoint at every intersection of a horizontal and a vertical bus. Moreover, there is a single inter-stage path linking each matrix of one stage with every matrix of the next succeeding stage. Thus, only one path 37 links stages 38 and 39. In like manner, one path 40 links stages 38, 41.

The grade of service is calculated for the entire network 30, as distinguished from any particular one of the cascaded stages. For example, the originating grade of service is based upon the probability of establishing a path between any inlet to a primary matrix (such as 35) and the originating end "O" (such as 42) of any link which is idle. Thus, it should be noted that the grade of service computation takes into account both the internal blocking which may occur within the network 30, as well as the probability of there being at least one idle link. It does not take into account external blocking which may occur in associated line circuits such as those which connect to points 35, for example.

DETAILED DESCRIPTION

For the purposes of this description, it will be assumed that the switching network 30 is used in a telephone system of the type shown in a copending application: V. E. Porter, Serial No. 17,003, filed March 23, 1960, now U.S. Patent 3,204,044. That system utilizes solid state crosspoints (PNPN diodes) which, for the first time, are able to self-select switching paths through the network. Thus, for the first time, this "self-selecting" ability of a crosspoint makes it economically practical to make full use of crosspoint minimization techniques. Other telephone systems using similar networks are described in the following copending applications: D. F. Seemann, E. R. Haskins, Serial No. 113,189, filed May 29, 1961; and N. V. Mansuetto, D. F. Seemann, E. G. Platt, W. K. C. Yuan, Serial No. 216,636, filed August 13, 1962. This application and all of the above-cited copending applications have a common assignee.

In greater detail, systems which utilize these solid state crosspoints may be designed to take full advantage of crosspoint minimization, primarily for the following reasons:

(1) The cost of the network is approximately proportional to the total crosspoint quantity, regardless of the switching configuration used.

(2) It is practical to provide simple switching control circuitry of a complexity, quantity, and cost that is almost independent of the number of switching stages into which the network is divided. Each call progresses through the network on a self-seeking basis, from its network inlet to its premarked destination at a network outlet. The call has the capability of exploring every alternate path possibility in its efforts to complete the required connection.

*Primary matrices*

In FIG. 2, one primary stage matrix is provided for each ten equipped line circuits, all line circuits being individually assigned to horizontals of the primary stage 31. Each of ten line groups has access, via a 10×5 or 50 PNPN crosspoint primary matrix, to five primary matrix verticals, and thence via five interstage paths (e.g. 37, 40) to one vertical inlet on each of five secondary stage matrices. Note that the total number of secondary matrices is equal to the number of verticals on each primary matrix. Note also that traffic both to and from the lines (2-way traffic) is carried by the primary matrices, the primary-secondary interstage paths, and the verticals of the secondary matrices.

*Secondary matrices*

Each secondary matrix in stage 32 is provided with ten verticals (one accessible from each of the ten primary matrices). Each secondary matrix is also provided with six horizontals, which are divided into two groups of three horizontals each. One group from each secondary matrix (a total of 15 altogether) are cabled to a link grading panel 45 (or printed circuit card). The originating ends "O" of the ten links are graded in an equitable pattern over these 15 secondary originating outlets. The second group of horizontals from each secondary matrix are cabled to a tertiary grading panel 46 (or printed circuit card). The tertiary stage 33 matrix horizontals are graded over these 15 secondary terminating outlets.

*Tertiary matrix*

One tertiary stage matrix 33 is required and is provided with a vertical per link, to which the terminating ends 47 of the links are cabled. Ten horizontals (their number is equal to the number of equipped verticals) are provided. These are cabled to the tertiary side of the tertiary grading card 46.

*Crosspoint requirements*

The total crosspoint quantity for this system includes 500 primary, 300 secondary and 100 tertiary switches, a total of 900 crosspoints and an average of 9 crosspoints per line, as compared with the 20-per-line requirement of the FIG. 1 matrix.

By following the above-described techniques, an ideal switching network may be designed to facilitate expansion in switching capacity from 20 to 1,000 network inlets at a cost relation which increases almost linearly with the number of inlets added to the network. This way, the switching network has extreme flexibility in that it may economically grow in size with the system in which it is used. There is no need to install unused capacity for future growth. Nor is there any need for tolerating substandard performance because the external system has outgrown its network.

For an understanding of the physical nature of this growth pattern, reference is made to FIG. 3. As there shown, a basic 100-line switching network is distributed over a number of printed circuit cards 50. Each card bears all components necessary to serve any conveniently sized group of the basic 100-lines 29. For example, group 51 represents facilities for serving ten lines. Obviously the group could be increased or decreased, as required.

As here shown, the primary matrix (Pri. #1) is provided with as many horizontal and vertical busses 52, 53 as are needed to serve the number of lines in group 51 with the desired grade of service. Also mounted on each card is one secondary matrix vertical for each primary matrix vertical. For example, the card 54 carries two primary matrix verticals; therefore, it also carries two secondary matrix verticals 55, 56. The horizontal multiples 57, 58 of the secondary matrices are formed by cables running between the cards. This way, the secondary matrix crosspoints are physically separated and electrically joined. Thus, any number of lines may be added simply by installation of new cards in group 50. As each card is added, both the primary and the secondary matrix multiples and crosspoints are added.

MATRIX DESIGN TECHNIQUES

With the foregoing description of how network components are assembled, it is thought that the remaining features of the invention will become apparent from the following discussion of how a network is designed.

*Matrix design procedures*

Except in the specific case of a completely non-blocking network (for which the grade of service is always exactly zero), it is meaningless to discuss or compare the relative crosspoint efficiencies of alternative networks and configurations unless they are, a priori, known to possess equal traffic-handling capability, or at least designed to give the same grade of service when offered the same volume of busy hour traffic. Otherwise we are not comparing equivalent things.

In theory at least, one must undertake the following steps to design a "minimum crosspoint" network, such as that shown in FIG. 2.

(1) Derive an equation which gives the total number of crosspoints as a function of the matrix parameters of the network for the particular configuration being studied, being careful to observe the relationship implicit in this particular network (e.g., the number of secondary matrices always equals the number of equipped verticals in the primary matrix; therefore, both numbers represent a single parameter).

(2) Derive an equation which expresses the grade of service of the network as a function of these same matrix parameters and of the volume of offered traffic. This can usually be at least approximated by constructing an appropriate probability linear graph (similar to those described by C. Y. Lee in his paper "Analysis of Switching Networks," appearing in the Bell System Technical Journal, vol. 34, November 1955) for calls through the network, assigning occupation values to the interstage paths, and calculating the equation for the blocking probability.

(3) For these two sets of relationships, attempt to derive an equation which expresses the crosspoint quantity in terms of the grade of service, the total traffic offered, and the occupation of the interstage paths.

(4) Then the problem is to find mathematically, for a given grade of service and traffic volume, those occupation values of the interstage paths which will make the total crosspoints a minimum. The first derivative of the crosspoint total with respect to the occupations must be equated to zero and solved for the occupation values.

(5) It will then be a simple matter to convert the resulting occupation values into corresponding matrix quantities and dimensions.

*"Equivalent secondary" concept*

From the network of FIG. 2, it is seen that if only 20 lines (for example) are to be equipped, only two primary matrices are needed. Hence only two verticals are used on each secondary matrix. Nevertheless, all five secondary matrices are provided.

Each of these matrices is equipped with six horizontals. Thus, the full 15 outlets are cabled to each of the two grading cards 45, 46. Only three links would probably be required to handle the traffic from the 20 lines. A 3 x 3 tertiary matrix is needed.

On cursory examination, perhaps it may appear that the continued use of five separate secondaries for this small partially-equipped 20-line system would be very inefficient, trafficwise. A single secondary matrix having ten verticals and six horizontals could serve the ten primary-secondary paths, and give access to the three links and the three equipped tertiary horizontals. However, from a traffic standpoint, the five secondaries are already equivalent to a single secondary matrix, inasmuch as the three links are graded as a full multiple to the three originating horizontals of each of the five secondary matrices. The same would be true of the three tertiary horizontals, with respect to the three terminating horizontals of each secondary matrix. For purposes of traffic calculation, this particular 3-link system can, therefore, be regarded as having but one equivalent secondary matrix, to which five paths exist from each primary matrix.

This concept of equivalent secondaries and equivalent primary-secondary paths from each primary matrix to each equivalent secondary matrix can be carried further, and a general formula established for calculating each of these equivalent values. These general formulae may then be used in deriving a grade of service equation which will be given later. These formulae are as follows:

$$\text{Equivalent secondaries } (m)=\frac{L}{y} \qquad [1]$$

$$\text{Equivalent paths } (x)=\frac{MXy}{L} \qquad [2]$$

where $m$=Number of equivalent secondaries $x$=Number of equivalent paths from each primary matrix to each equivalent secondary $M$=Actual number of secondary matrices $X$=Actual number of paths from each primary to each secondary matrix $L$=Number of equipped links $y$=Number of horizontal outlets from each secondary matrix to the link grading card In the system shown in FIG. 2, $M=5$, $X=1$, *and* $y=3$. It is interesting to note that the product $(mx)$ is always equal to the product (MX).

*Originating grade of service calculations*

The originating grade of service given by a matrix configuration of the general type shown in FIG. 2 can now be calculated with reasonable accuracy using the formula:

$$P(>0)=P''(L,a)+[1-P''(L,a)]B''(N-1,mx,s)+\sum_{r=j}^{m-1}P'(r+m(y-1),a)\,s^{x(m-r)}\frac{C^{N-1}_{x(m-r)}}{C^{mx}_{x(m-r)}}[1-B''(N-1-x(m-r),rx,s)] \qquad [3]$$

where $P(>0)$=Originating grade of service $L$=Total number of links in service $a$=Total link traffic in Erlangs (CCS/36)

$s$=2-way (orig+term) traffic *per line,* in Erlangs $y$=Number of secondary horizontals per secondary matrix, cabled to link grading card $x=MXy/L$ $m=L/y$ $N$=Number of horizontal inlets per primary matrix $j$=Lower limit of summation

- $j=1$ if $m$ is an integer
- $j$=The fractional remainder of $m$, if $m$ is not an integer $r$=The summation variable. In carrying out the summation, $r$ takes the successive values: $j$, $j+1$, $j+2$, etc., until the final value, $m-1$, is reached $P'(i,a)$=Individual term of Poisson's Exponential Binomial Limit Distribution:

$$=\frac{a^i e^{-a}}{i!}$$

$P''(c,a)$=Cumulated term of Poisson's Exponential Binomial Limit Distribution:

$$=\sum_{i=c}^{\infty}a^i e^{-a}/i!$$

$B''(n,c,s)$=Cumulated term of Binomial Probability Distribution:

$$=\sum_{i=c}^{n}B'(n,i,s)$$

$$=\sum_{i=c}^{n}C_i^n s^i(1-s)^{n-i}$$

$C_j^k$=Number of possible combinations of $(k)$ things, taken $(i)$ at a time:

$$=\frac{k!}{i!(k-1)!}$$

The grade of service $P(>0)$, calculated from Equation 3, is then given by the sum of the three terms of this equation:

| | |
|---|---|
| 1st term: | 0.005 699 |
| 2nd term: | 0.000 253 |
| 3rd term: | 0.000 625 |
| | 0.006 667 $=P(>0)$ |

The first term (0.005 799) represents the "full-availability" grade of service (i.e., the proportion of busy hour calls which will find all links busy, regardless of whether or not any internal blocking is present in the switching network), or about 58 in 10,000.

The second and third terms (toalling 0.000 878) represent the proportion of calls which encounter internal blocking in the matrix itself, even though all the links are not busy. The second term indicates the probability that a busy hour call will find all its five matrix outlets busy at its primary matrix, while the third term represents the probability that even though all the primary outlets are not busy, no secondary can be reached which has access to an idle link. It will be seen that in the example shown, the proportion of calls which fail or are delayed in getting a link due to internal blocking in the network is less than 9 in 10,000, and constitutes only about 13 percent of the total of about 67 calls in 10,000 which encounter congestion.

*Terminating grade of service*

In the system of FIG. 2, the terminating grade of service is equal to or slightly better than the originating grade of service (assuming equal rates of originating and terminating traffic). The reason for this is obvious. An originating call is successful if it reaches the "0" side of *any* one of the idle links 21. The termination of the call is successful (from the traffic standpoint) if the called line reaches the terminating "T" side of the *particular* link associated with the calling line. It can do so if it is able to complete a path to any one of the idle tertiary matrix horizontals at the tertiary grading card 46. Since the number of tertiary horizontals is made equal to the number of equipped links, and since the number of secondary outlets to the link and tertiary grading cards are equal, it follows that at the moment of any call termination through the network, the number of terminating paths which are potentially useable are equal to the number of potentially useable originating paths which exist at that same moment. Therefore, the probability of failure or delay to a terminating call is mathematically the same as for an originating call. If the quantity of equipped tertiary horizontals is arbitrarily increased to a number in excess of the number of links, the terminating grade of service is improved (i.e., lowered in value) to a degree equivalent to an improved originating grade of service such as would be obtained by adding additional links to the system.

*Number of primary verticals and secondary matrices*

It is important that the internal blocking of the network be kept small. The link group efficiency should be approximately equivalent to that of a full-availability link group. Otherwise, additional links would be needed, to compensate for such blocking. For a grade of service of 0.01, the proportion of calls which can be allowed to fail or be delayed due to encountering an all-primary-matrix-verticals-busy condition must not exceed more than about 3 to 7 percent of this amount, or about $$0.0005 \pm 0.0002$$

and must thus satisfy the following relationship:

$$B''(N-1, M, s) = 0.0005 \pm 0.0002 \quad [4]$$

where $N$=Horizontal inlets (lines) per primary matrix
$s$=2-way traffic (originating+terminating) per line, in Erlangs
$M$=Number of verticals per primary matrix (and consequently, the number of equipped secondary matrices)
$B''()$=Cumulated term of Binomial Probability Distribution Based on Equation 4, the number of verticals which should be equipped, on each 10-horizontal primary matrix, and therefore the number of secondary matrices which should be provided for the system, will depend on the 2-way traffic per line, and is given in Table I.

TABLE I.—TRAFFIC CAPACITY OF 10-HORIZONTAL PRIMARY MATRIX

| Number of Equipped Primary Verticals (M) | Average 2-Way Traffic per Line CCS | Total 2-Way Primary Matrix Traffic Capacity CCS |
|---|---|---|
| 4 | 1.7 | 17 |
| 5 | 3.0 | 30 |
| 6 | 5.2 | 52 |
| 7 | 7.8 | 78 |
| 8 | 11.0 | 110 |

An average 2-way traffic per line in excess of 7.8 CCS appears quite unlikely. Therefore, the primary matrix can be designed to have a maximum vertical capacity of 7. Likewise, the system can be designed to provide for a maximum of 7 secondary matrices, each with a 10-vertical, 6-horizontal capacity. The variations in secondary matrix quantity and in primary matrix vertical quantity required for specific system applications is readily achieved through the special matrix construction to be discussed later.

The single tertiary matrix must, in all cases, be equipped with one vertical for each equipped link. The number of equipped tertiary horizontals should equal (but may, if desired, exceed) the number of equipped links.

*Printed circuit card construction*

The foregoing specification explains how the crosspoints may be electrically distributed throughout the switching network 30 of FIG. 2. Next to be explained is how the crosspoints may be physically distributed on the printed circuit cards 50 (FIGS. 3 and 4).

*Construction of primary-secondary matrix*

A distinctive feature of the system is the method of constructing the primary-secondary matrix network. One printed circuit card of the plug-in type is furnished for each primary matrix. Only as many cards are provided as are needed to accommodate the quantity of lines actually served by the system. For example, a 40-line system requires only 4 primary matrix cards. Each such card provides a 10-horizontal, 7-vertical printed primary matrix. At the horizontal-vertical intersections of the matrix are mounted PNPN diode (or other type) crosspoints for the required number of equipped verticals (5, 6 or 7). On this same card, the 7 primary verticals (if that is the number) are extended to form the corresponding 7 secondary verticals. There is one vertical for each secondary matrix to which this particular primary matrix has access. Each of these secondary verticals which is associated with an equipped primary vertical is provided with the required number of crosspoints; thus, for the FIG. 2 configuration, each secondary vertical has six crosspoints. The 42 (7×6) horizontal segments of the secondary matrices are extended to connector terminals (such as 59) on the edges of the cards. Thus, each primary matrix card includes not only the primary matrix itself, but also that portion of each secondary matrix which is reached from this particular primary matrix. Again, it should be noted that single-path inter-stage linking is provided.

The 10 (or fewer) matrix cards required are plugged in side by side to form a compact group, as shown in FIG. 3. By multipling across all these cards to the respective 30, 36 or 42 secondary horizontal terminals of each card, the six complete horizontals 57, 58 for each of the 5, 6 or 7 secondary matrices are obtained.

*Grading cards*

The link grading panel 45 and the tertiary grading panel 46 are in the form of printed circuit cards. Each is provided with two rows of posts placed to form a convenient jumper field for manually cross-connecting the grading pattern, as required. A set of grading patterns, all conveniently indexed for the particular secondary matrix quantity and link or tertiary horizontal quantity for which they apply, make it a simple matter to provide the correct gradings for each specific application, initially, or as late system growth may require.

The tertiary matrix is also in printed-card form, but it may require as many as four cards. The reason for this will soon be made evident.

*Feature trunks and trunks to telephone central office*

Up to this point, the 100-line system has been restricted to operations wherein every call is directed to another line in the same system. In general, however, and particularly when the system is used in or in connection with a telephone central office, there must also be facilities for special features (conference trunks, tie lines to another system, trunks to access a public address system, dictation trunks, and so on).

On calls to these special feature trunks, or to trunks to the central exchange, it is unnecessary for the call to retain the original link in use after the calling line has completed dialing. Therefore, after the originally seized link has received the dialed digits, recognized the code of a features call, and passed this information to the switching control equipment, the link disassociates itself from the calling line circuit. Then the calling line circuit seeks access, via the primary, secondary and tertiary matrices, to the marked trunk representing its destination. Each trunk is terminated at the tertiary matrix on a vertical of its own, as shown at 60. From a traffic viewpoint this trunk connection is treated as a terminating link. Connections are made to a trunk in much the same manner as called lines on local calls are extended through the tertiary matrix to the terminate end of the link.

In calculating matrix sizes, the trunk groups may, for all practical purposes, be considered as "full-availability" groups. Thus, the required number of trunks, and their associated tertiary crosspoint sets, are determined on this full availability basis for the required grade of trunk service.

*Precautions in engineering equipment quantities*

When engineering 100-line (or smaller) switching systems, it is necessary to observe the following precautionary rules:

(1) The choice of how many primary matrix verticals to equip, and how many secondary matrices are required is determined by the average originating + terminating traffic per line, regardless of how this traffic may be divided.

(2) The quantity of links to be provided depends only on the total volume of link traffic. Here account is taken that on originating calls to trunks the link is held only briefly and, on incoming trunk calls, not at all. For all practical purposes, the link group can be assumed to have an efficiency of a 0.01 grade of service "full-availability" group (see Table II).

(3) The tertiary matrix should be equipped with one vertical for each link and for each trunk. The number of equipped tertiary horizontals should equal the number of verticals. But the number of verticals need never exceed three times the number of equipped secondary matrices, in which event a straight one-for-one grading is used between the secondary and tertiary horizontals at the tertiary grading card.

*Tertiary matrix cards*

The equipped vertical and horizontal requirements for the tertiary matrix varies widely for different applications. The largest tertiary matrix which can be conveniently accommodated on a single matrix card of reasonable size is an 11-horizontal, 15-vertical matrix. Preferably such a matrix should be employed only for systems having a total of not over 11 links and trunks. It is estimated that the largest 100-line system requirement will not exceed 30 links and trunks; this would require a tertiary matrix having 30 verticals and 21 horizontals (7 secondary matrices ×3). This is achieved by the use of a 4-card matrix pattern. Provision is, therefore, made in the design of the system to accommodate a maximum of four tertiary cards. In any specific application, one, two or all four cards will be required.

200-LINE ELECTRONIC SWITCHING NETWORK

The above described basic 100-line system network may be expanded up to 200 lines by the addition of a second 100-line unit 66, if suitable precautions are observed. Such a 200-line version of the system network is shown in FIG. 5.

The primary-secondary matrix network for each 100-line unit remains unchanged. It is not necessary to distribute the lines equally between both units. Both 100-line units may be of equal line capacity, or one unit may be fully-equipped and the other unit partially equipped.

*Link requirement*

Both units are served by one common group of links 21. The originating sides 67 of all the links are multiplied to the link grading cards 45*a*, 45*b* of both units, where they are graded over the originating horizontals of the secondary matrices of both units in the most equitable pattern possible. Thus, each unit has access either to all the links, or to as many links as the number of secondary originating horizontals will permit. When a common group is used, the total number of links required are fewer than would be required if each basic unit of 100 lines were to be provided with its own separate link group, because of the greatly increased traffic-handling efficiency of a single large group, compared with that of two separate groups, each one-half the size of the single group.

The number of links required for either a 100-line or 200-line system depends on the total link traffic, and is given in the following link group traffic capacity table (Table II).

TABLE II.—LINE GROUP TRAFFIC CAPACITY

| Number of Links Required | Total Link Traffic (CCS) | Number of Links Required | Verticals per Primary: 5 | 6 | 7 |
|---|---|---|---|---|---|
| | | | Total Link Traffic (CCS) | | |
| 3 | 15.7 | 16 | 292 | 294 | 294 |
| 4 | 29.6 | 17 | 316 | 320 | 320 |
| 5 | 46.1 | 18 | -------- | 346 | 346 |
| 6 | 64.4 | 19 | -------- | 370 | 373 |
| 7 | 83.9 | 20 | -------- | 395 | 399 |
| 8 | 105 | 21 | -------- | 420 | 426 |
| 9 | 126 | 22 | -------- | 445 | 450 |
| 10 | 149 | 23 | -------- | 470 | 475 |
| 11 | 172 | 24 | -------- | 495 | 500 |
| 12 | 195 | 25 | -------- | 520 | 525 |
| 13 | 219 | 26 | -------- | -------- | 551 |
| 14 | 244 | 27 | -------- | -------- | 577 |
| 15 | 269 | 28 | -------- | -------- | 603 |
| | | 29 | -------- | -------- | 629 |
| | | 30 | -------- | -------- | 656 |
| | | 31 | -------- | -------- | 683 |
| | | 32 | -------- | -------- | 710 |
| | | 33 | -------- | -------- | 736 |
| | | 34 | -------- | -------- | 763 |
| | | 35 | -------- | -------- | 790 |

*Tertiary matrix requirements*

Two identically-equipped tertiary matrices 68, 69 are provided, regardless of how unbalanced the line distribution may be between the two units. The terminating sides of half of the links 21 are terminated on verticals of the first tertiary matrix 68. The other half of the links terminate on verticals of the second tertiary matrix 69. Thus, the total traffic from both units tends to divide equally among the two tertiary matrices, regardless of the basic unit of 100-lines in which a call originates.

The equipped horizontals of each tertiary matrix are divided into two equal groups 70, 71. One group 70 from each tertiary matrix terminates on the tertiary grading card 46*a* of the first 100-line unit 29. The other group 71 from each tertiary matrix terminates on the second 100-line unit 66 tertiary grading card 46*b*. Thus, the secondary matrices of both 100-line units are given equal access to both tertiary matrices.

Unlike the single 100-line system of FIG. 4, the total number of tertiary horizontals (on both matrices 68, 69) is normally required to exceed the total number of links and trunks combined. When a terminating path, or a line-to-trunk path, is switched in the 200-line system network of FIG. 5, the line must seek a path to that particular one of two tertiary matrices on which the calling line link or the required trunk is terminated. Only half of the available secondary terminating horizontals (70 or 71) lead to this particular terminating matrix. Thus, the efficiency of the network is lowered by using two separate tertiary matrices instead of one large matrix. To compensate for this inefficiency, I here employ a higher ratio of tertiary horizontals to tertiary verticals than I employ in the 100-line system of FIG. 4. Even so, the total tertiary crosspoint requirements per line are somewhat less for the 200-line system than for the 100-line system, in most cases.

Table III shows the number of equipped tertiary horizontals required on each of the two matrices, for any given system total of links and trunks.

TABLE III.—NUMBER OF EQUIPPED TERTIARY HORIZONTALS FOR 9200-LINE SYSTEMS

| Total Links Plus Trucks | Tertiary Horizontals on Each Matrix | Total Tertiary Horizontals |
|---|---|---|
| 7, 8 | 5 | 10. |
| 9 | 6 | 12. |
| 10, 11 | 7 | 14. |
| 12, 13 | 8 | 16. |
| 14, 15 | 9 | 18. |
| 16 | 10 | 20. |
| 17, 18 | 11 | 22. |
| 19 | 12 | 24. |
| 20, 21 | 13 | 26. |
| 22 | 14 | 28. |
| 23, 24 | 15 | 30 (Limit for 5-sec's.). |
| 25 | 16 | 32. |
| 26, 27 | 17 | 34. |
| 28 | 18 | 36 (Limit for 6-sec's.). |
| 29, 30 | 19 | 38. |
| 31 | 20 | 40. |
| 32 or more | 21 | 42 (Limit for 7-sec's.). |

*Allocation of trunk groups*

Trunk groups having two or more trunks may be divided into two subgroups. The trunks of each subgroup are terminated on verticals of a different tertiary matrix. If the "group" is a single-trunk, it should be multiplied to a vertical of each tertiary matrix. Thus, this single-trunk may be reached via either tertiary matrix. However, when this is done, the single 2-appearance trunk is counted as a single trunk for purposes of determining from Table III the required quantity of equipped tertiary horizontals.

MULTI-HUNDRED LINE SWITCHING NETWORK

*New basic configuration necessary*

Means are provided for expanding the system up to at least one thousand lines by the simple process of adding together, with only minor matrix modification, as many basic 100-line units as are desired. In greater detail, the techniques employed for combining two 100-line units (FIG. 2) to produce a 200-line system (FIG. 5) cannot safely be extended to larger multi-hundred line systems. To do so, it is necessary to provide secondary matrices of larger horizontal capacity. Thus, tertiary matrices 68, 69 require an accelerated ratio of horizontals to verticals. Such a procedure does not further the interests of either system standardization or crosspoint minimization. Consequently, a revised system network configuration has been developed, wherein a basic 100-line unit of maximum crosspoint efficiency is used as the building block for further system expansion.

In construction, FIG. 6 shows a thousand line group 105 made up of ten 100-line groups 29, etc. The showing of a thousand lines is here made only because it is the maximum number of lines available with three-digit directory numbers. The size of the group may be increased if a four digit directory number is used.

As indicated by the notation H1–H4 (on the upper left-hand corner of the first two group indicating rectangles), four hundred lines are assembled into a first division of lines served exclusively by a single pool of common links **21*a*, which also bear the notation H1–H4. A second division of four hundred lines are not shown to conserve drawing space. They will also have their own common pool of links, also not shown. A third group of two hundred lines are served exclusively by another pool of common links 21*b*, which bear the notation H9–H10. The dashed lines 106, 107** indicate the equipment (not shown) for serving the remaining line groups.

In addition, FIG. 6 shows a trunk circuit 108 which represents any suitable number of devices for giving each line access to special equipment such as a telephone central office or a features link. Finally, FIG. 6 shows a pool of common registers 109 which receives and stores informational data required to complete connections. The dashed lines **110*a*, 110*b*, 110*c* indicate that any link 21 or trunk 108 may call in any idle register 109 to receive and store data, as required. The connection to the register is completed via a switch 111** of any convenient design.

To illustrate the switching principles, assume that line 112 is calling line 113. When completed, an exemplary switch path might extend from line 112 through matrices 114, conductor 115, link **21*a*, cable 116, distribution panel 117, cable 118 (for example), and equipment 119 to line 113. For a call from line 112 to line 120, the switch path extends over the same components to panel 117, cable 118 (for example), and equipment 122 to line 120. If a call is extended from line 120 to line 112, the path is through equipment 122, links 21*b*, cable 116, panel 117, and equipment 123 to line 112**.

With this description of the structure of FIG. 6 in mind, it is thought that the computation for crosspoint distribution will be apparent from a study of the system network concept as shown in FIG. 6. The switching network (123, for example) for each basic 100-line unit constitutes an independent four-stage matrix configuration capable of providing virtually non-blocking switching between its 100 lines and any trunk or the terminating side of any link in the entire system. The first three stages 114 also provide any calling line in the 100-line unit 29 with access to the originating side of a common link group **21*a*** which serves a maximum of 400 lines. The entire system switching network will be made clear by an analysis of the design of a single basic 100-line unit.

*Primary-secondary matrix stages*

It will be seen from FIG. 6 that a full spread pattern of interstage paths is provided between each adjacent pair of switching stages. The 10-inlet primary matrices are provided as in the system of FIG. 2. The number and arrangement of primary-secondary paths is identical to the 100-line system, and the quantity of secondary matrices is also identical, since this arrangement is determined on the basis of the same 2-way traffic per line considerations which applied before. Hence, Table I is still valid for this system. As before, the primary matrix cards will include their respective portions of all the secondary matrices. However, the resemblance to the earlier network ends here.

The multi-hundred line systems do not employ a single-matrix tertiary stage, having a size which varies with each application. In its place are substituted two stages of switching matrices here termed A and B stage matrices 130, 131.

*A matrix arrangement—FIGS. 6 and 8*

The number of A matrices 130 (and in consequence the quantity of horizontals on each secondary matrix) is variable, being always fixed at one less than the number of equipped secondary matrices. Thus, the A matrix quantity is also determined by the average 2-way traffic per line. As with the tertiary matrix, the number of horizontals on the A matrix is equal to the number of equipped secondary matrices. This fixed numerical relationship between the A and the secondary matrices serves a very useful purpose in that it makes possible the cabling of a fixed pattern spread of paths 135 between these two switching stages. It so happens that whether the traffic per line requires a 5-, 6-, or 7-secondary system, the same spread pattern provides correct interstage paths. Those paths which serve no useful purpose when only 5 or 6 secondary matrices are equipped are open at either or both ends, and no path reassignments are ever required.

Each A matrix 130 is equipped with two groups of verticals. The first group 136 consists of not more than 3 link verticals and terminate on the link grading card 133 of the unit 123. A second group 137, called B verticals, provide interstage paths to the B matrices 131. The number of equipped B verticals depends upon (1) the quantity of B matrices required which may vary from one to nine, (2) the total volume of 2-way busy-hour traffic carried by the busiest 100-line unit, and (3) the proportion of busy hour traffic which consists of link-holding traffic as distinguished from B-matrix traffic.

*Calculation of A and B matrix quantities and sizes*

The A and B matrix quantities and sizes required for the system are determined initially by an analysis of an equation expressing the grade of service of the network configuration in terms of network parameters and total offered traffic. Then, the equation is analyzed to discover what possible combinations of varying parameter values are needed to yield a series of networks all having equivalent traffic-handling capability. These possible parameter sets are then substituted into a second equation expressing the total crosspoint quantity in terms of these same parameters. A network is then found which requires a minimum number of cross-points to handle the required traffic volumes at the stipulated overall grade of service (0.01 in each direction).

*Probability linear graph construction*

The grade of service formula for this type of configuration is determined by constructing a probability linear graph which represents the total number of possible switching paths available to any call from a particular primary matrix inlet to a particular outlet (such as a specific trunk 108 at a particular B matrix outlet). Each possible interstage path is designated with its respective occupation probability. Each possible matrix which could provide a switching point is represented as a nodal point in the probability graph. The interstage paths are shown as line interconnecting the node points. A probability linear graph constructed in the described manner for the FIG. 6 network is shown in FIG. 7. Only one primary and one B matrix are involved because specified end points are marked. But, every secondary and A matrix is involved because a path may find its way through any of them. There are S primary-secondary paths involved, each having an occupation probability $P_1$ and an idle probability of $q_1=1-P_1$. If a total 2-way traffic of $a$ Erlangs (36$a$ CCS) is assumed for the 100 lines of this unit 123, then $P_1=a/PS$, where P and S are the number of primary and secondary matrices in the unit.

Similarly each secondary-to-A matrix path has an occupation $P_2=a/SA$.

Also, each A matrix to B matrix interstage path has an occupation $P_3=a_B/AB$, where $a_B$ represents the total traffic carried by the B matrices, and excludes that portion of the total traffic ($a$) which is carried by links instead of by the B stage.

*Grade of service of the network*

Derivation of the grade of service equation, based on an analysis of the FIG. 7 graph, is rather arduous, but it is given precisely by the equation below:

$$P(>0)=\sum_{k=0}^{S}C_k^S(1-P_1)^kP_1^{S-k}[(1-P_3)P_2^k+P_3]^A \quad [5]$$

$$=\sum_{k=0}^{S}B'(S,k,q_1)[q_3P_2^k+P_3]^A \quad [6]$$

Blocking may also occur in the primary matrix itself, due to the possibility of the call finding all the primary verticals busy. This blocking is not indicated on the probability linear graph. Therefore, the equation must be modified to account for this blocking, as follows:

$$P(>0)=B''(N-1,S,s)+\sum_{k=1}^{S}B'(N-1,S-k,s)[q_3P_2^k+P_3]^A \quad [7]$$

where $s$=Average 2-way traffic *per line* in Erlangs $$s=\frac{P_1S}{N}$$

$N$=Number of "horizontals" per primary matrix ($N$=10)

B' and B"() represent individual and cumulated terms, respectively, of the Binomial Probability Distribution.

The best solution for the network, in the interests of both system standardization and crosspoint minimization, is to assign A a value of one less than S, and thus allow B to take whatever value is then required to guarantee the desired network grade of service.

*Trunk and link distribution to B groups*

The multi-hundred line system is furnished with a trunk and link distribution panel 117. There all trunks and the terminating side of all the links are assigned to the B matrix outlets by cross-connections. Each common group of links and each trunk group is divided as equally as possible among the several B matrices (although this division is not too critical with respect to any particular trunk group). The number of B groups must equal the number of B matrices per 100-line unit, and will vary, in any application, between 1 and 9. Each B group is cabled from the distribution panel 117 to the outlets of its associated B matrix in the first 100-line unit, and thence multipled to the outlets of the corresponding B matrix in every other unit in the system. Thus, every trunk 108 and the terminating end of every link 21 is accessible to every line in the system, via the 4-stage network of each respective 100-line unit, 123, 119, 122.

*Construction of A and B matrices*

In the same manner that the secondary matrices of FIG. 3 are built up from the secondary matrix segments included on the associated primary matrix cards, so each A matrix card 140 (FIG. 8) also provides those portions of the B matrices (131, for example) which are associated with the verticals of that particular A card. However, there is this difference between the FIGS. 3 and 8 embodiments. The A card 140 has only sufficient space to provide crosspoints for a maximum of 5 outlets from each B matrix, whereas the total number of outlets which each B matrix requires may be very much greater than this, for systems having a large number of 100-line units, and therefore larger numbers of links and trunks. If, for example, each unit requires 5 B matrices, then B=5, and each B matrix must have a sufficient number of outlets to accommodate ⅕ of the total trunks and links in the system. If the system actually has but one 100-line unit equipped, using 10 links and 10 trunks, then each B matrix must be equipped with $$\frac{10+10}{5}$$

or 4 outlets. But if this is a 1000-line system having, for example, 76 links and 94 trunks, then each B matrix must have outlet facilities to accommodate a "B" group of $$\frac{76+94}{5}$$

or 34 outlets.

To provide additional outlet facilities additional jacks are associated with each A matrix card 140. Thus, the B matrices 131 already provided on the A matrix card 140 may be enlarged by plugging in several B matrix extension cards such as 142. Each B matrix extension card 142 provides 6 additional outlets 135 to every B matrix such as 131. Also, if the number of B matrices is less than 5, B multipling cards 143 are available. The B multipling cards 143 carry printed circuit strip lines 145 for multipling any unused B group outlets back into the B group. Thus, when card 143 is plugged into an unused B matrix extension card jack, the output of any unused B matrix portion of the A cards is fed back to available crosspoints. Thus, the B matrix extension cards 142 may be scattered irregularly throughout the network to provide additional outlet capacity for the B matrices. This use of B multipling cards 143 makes possible a substantial reduction in the quantity of B extension cards 142 required. In some instances, it even makes their use unnecessary altogether.

*Number of B matrices and "B" groups*

The minimum required quantity of equipped B matrices for each 100-line unit is given by a simple formula of the type:

$$B=\frac{a-a_L}{K} \qquad [8]$$

where $B$=Number of B matrices per 100-line unit; also the total number of "B" groups required
$a$=Total 2-way traffic (in CCS) per 100-line unit
$a_L$=Total link traffic (in CCS) per 100-line unit
$K$=A constant (for all practical purposes) whose value is determined by the number of equipped verticals per primary matrix:

For 5-vertical systems, $K=41$
For 6-vertical systems, $K=65$
For 7-vertical systems, $K=90$ If the calculated value of B is a mixed number (i.e., not an integer), then the next higher integral value is used. This represents the smallest quantity of B matrices per basic 100-line unit required to handle the traffic in that unit. Any larger number, up to nine, of B matrices (and B groups) may be provided, if desired. This is extravagant of crosspoints since a larger number of A matrix verticals must then be also equipped. However, it is usually advisable to base the number of equipped B matrices, and B groups, on the anticipated ultimate system traffic requirements per basic 100-line unit, rather than on initial requirements. Thus, if there are any later traffic increases anticipated, the initial provision of a sufficient number of B groups will forestall any need for a later increase in B groups, and avoid any occasion for the redistribution of all the links and trunks which would then be required.

*Size of link groups*

One common group of links 21 is provided for each four 100-line units, or fraction thereof. Table IV shows the traffic capacity of link groups serving 5-vertical primary type systems. In calculating these tables, account is taken of (1) the quantity of sources (secondary to A matrix paths from 1, 2, 3 or 4 units) having direct access to the link group and (2) three stages of matrix switching 114 involved in reaching the links. Similar tables are required for the 6-vertical and 7-vertical system link groups.

TABLE IV.—LINK GROUP TRAFFIC CAPACITY FOR SYSTEMS HAVING 5 VERTICAL PRIMARIES

| No. of Links in Groups | No. of 100-L. Units* Served by Group: 1 | 2 | 3 | 4 | Equipped Link Vert's Per A Matrix |
|---|---|---|---|---|---|
| | Link Group Traffic Capacity in CCS | | | | |
| 3 | 13.7 | 13.6 | 13.5 | 13.4 | 1 |
| 4 | 27.4 | 27.0 | 26.7 | 26.4 | 1 |
| 5 | 44.4 | 42.8 | 41.9 | 41.2 | 2 |
| 6 | 64.1 | 60.2 | 58.5 | 57.4 | 2 |
| 7 | 85.9 | 79.9 | 77.4 | 75.4 | 2 |
| 8 | 109 | 102 | 98.1 | 95.3 | 2 |
| 9 | 135 | 124 | 120 | 118 | 3 |
| 10 | 162 | 148 | 144 | 141 | 3 |
| 11 | | 174 | 169 | 165 | 3 |
| 12 | Note 1 | 200 | 194 | 189 | 3 |
| 13 | | 221 | 215 | 210 | 3 |
| 14 | | 243 | 237 | 232 | 3 |
| 15 | | 265 | 259 | 254 | 3 |
| 16 | | 287 | 281 | 276 | 3 |
| 17 | | 309 | 303 | 299 | 3 |
| 18 | | | 326 | 322 | 3 |
| 19 | | | 350 | 346 | 3 |
| 20 | | | 374 | 370 | 3 |
| 21 | | | 398 | 395 | 3 |
| 22 | | | 423 | 419 | 3 |
| 23 | | | 447 | 444 | 3 |
| 24 | | | 472 | 469 | 3 |
| 25 | | | | 494 | 3 |
| 26 | | | | 519 | 3 |
| 27 | | | | 545 | 3 |
| 28 | | | | 571 | 3 |
| 29 | | | | 596 | 3 |
| 30 | | | | 621 | 3 |

NOTE:

1. Link Groups of 13 or more will be graded over the 100-line units on an "access-12" basis.

*If more capacity is required, a separate link group will be provided for each 4 100-line units or fraction thereof.

*Crosspoint quantities required*

The total crosspoint requirements of the multi-hundred line system network depend on three variables:

(1) Whether a 5-, 6-, or 7-vertical primary matrix is required (which is a function of the 2-way traffic per line. (See Table 1.)

(2) The total number of links and trunks in the system. (See Table IV.)

(3) The number of B-groups (which equals the number of B-matrices per 100-line unit, and is a function of the total 2-way traffic carried by the B-stage of each unit. (See Equation 8.)

For purposes of comparison, the total crosspoints per line for the various system sizes can be summarized as follows:

For 5-vertical systems:
8.40 to 9.00+0.04 (links+trunks)
For 6-vertical systems:
11.40 to 12.00+0.05 (links+trunks)
For 7-vertical systems:
14.98 to 15.84+0.06 (links+trunks)

A single 100-line, 10-link system of the multi-hundred line type, but having the same traffic capacity (1.5 CCS, each way, per line) as the 100-line system shown in FIG. 2, would require 8.8 crosspoints per line, as compared with the 9.0 crosspoints per line required by the 2-stage system. The multi-hundred line matrix configuration of FIGS. 6–8 is, therefore, suitable for use in any size system from the smallest to the largest 1000-line application.

For any given verticals-per-primary value, the number of crosspoints per line is remarkably constant, regardless of the number of hundreds of lines served by the system. As an example of this, FIG. 9 shows the crosspoints per line versus the number of equipped lines for 5-vertical systems, based on a 2-way traffic of 3.0 CCS per line. A variation of less than 13.1% occurs over the whole range of system sizes from 20 lines to 1000 lines, with the minimum occurring at 100 lines. For a system with a 10% ratio of trunks to lines, the variation is less than 14.7%.

*Index of crosspoint efficiency*

The true measure of crosspoint efficiency for a switching network of the type described is expressed in terms of the number of crosspoints per line per CCS of 2-way traffic, for a given grade of service. FIG. 10 shows this quantity as a function of the 2-way traffic rate per line. It will be seen from this curve that for the 4-stage switching network, the crosspoint efficiency is improved as the density of the traffic is increased, assuming that the rules regarding the number of required primary verticals, secondary matrices and A matrices are correctly followed.

While the principles of the invention have been described above in connection with specific apparatus and applications, it is to be understood that this description is made only by way of example and not as a limitation on the scope of the invention.

I claim:

1. An electronic switching network for selectively extending paths from a plurality of network inlets to a plurality of network outlets, said network comprising a plurality of self-selecting crosspoints electrically assembled into cascaded matrices, said cascaded matrices extending between the inlets and outlets of said network, means comprising a plurality of printed circuit cards for physically assembling said crosspoints into a compact group of components, each of said cards which carries a network inlet connection also carrying the added crosspoints necessary to give said inlet connection access to said network with no loss in the grade of service given by said network, whereby the addition of a card bearing an inlet to the switching network assembly automatically adds all crosspoints required to give network switching capacity to serve said inlet, and intercard cabling means for electrically joining the crosspoints physically mounted on said additional card into said electrical assembly.

2. The network of claim 1 and means comprising a printed circuit card carrying a jumper field for cross-connecting said intercard cabling to provide any desired grading pattern between said network and circuits connected to said network.

3. The network of claim 1 wherein the last of said cascaded matrices comprises crosspoints divided into A and B groups, means for extending connections originating at an inlet through said network to one of said "A" groups of crosspoints and from said one A group of crosspoints to one of said network outlets, and means comprising both said A and B groups for extending terminating connections from a selected inlet to a selected one of said network outlets.

4. The network of claim 3 and means comprising certain of said printed circuit cards which carry crosspoints for extending said B groups to enlarge the switching capacity of said network, and means comprising other printed circuit cards carrying strip lines only for multiplying unused B group outlets back into said B group thereby providing connection points for said intercard cabling to facilitate later network growth when said extension cards are substituted for said multiplying cards.

5. The network of claim 4 wherein the crosspoints are distributed throughout the network in accordance with the following formula:

$$B=\frac{a-a_L}{K}$$

where $B$=Number of B matrices per 100-line unit; also the total number of B groups required.

$a$=Total 2-way traffic (in CCS) per 100-line unit $a_L$=Total link traffic (in CCS) per 100-line unit $K$=A constant (for all practical purposes) whose value is determined by the number of equipped verticals per primary matrix.

6. The network of claim 4 wherein the crosspoints are distributed throughout the network in accordance with the following formula:

$$P(>0)=B''(N-1,\ S,\ s)+\sum_{k=1}^{S}B'(N-1,\ S-k,\ s)[q_3P_2^k+P_3]^A$$

where $s$=Average 2-way traffic *per line* in Erlangs $$s=\frac{P_1S}{N}$$

$N$=Number of "horizontals" per primary matrix ($N$=10)

B′ and B″() represent individual and cumulated terms, respectively, of the Binomial Probability Distribution.

$S$ and $A$=Number of secondary matrices and A matrices, respectively, per 100-line unit $P(>0)$=Originating grade of service $P_1$=Occupation probability between the primary and secondary paths $P_2$=Occupation probability existing in secondary-to-A matrix path $P_3$=Occupation probability existing in A matrix to B matrix interstage paths $q_3$=1=$P_3$=idle probability between A matrix and B matrix interstage paths $k$=a constant 7. An electrical switching network comprising a plurality of crosspoints distributed in full availability switching matrices, each of said matrices comprising a plurality of vertical and horizontal busses arranged with intersecting crosspoints, means associated with each of said crosspoints for opening or closing electrical circuits between the busses intersecting at said crosspoint, there being at least four stages of cascaded matrices in said network with single path interstage linking between each matrix in one stage and every other matrix in the adjoining stage, the distribution of said crosspoints in said networks being arranged in accordance with the following formula:

$$B=\frac{a-a_L}{K}$$

where $B$=Number of B matrices per 100-line unit; also the total number of B groups required.

$a$=Total 2-way traffic (in CCS) per 100-line unit $a_L$=Total link traffic (in CCS) per 100-line unit $K$=A constant (for all practical purposes) whose value is determined by the number of equipped verticals per primary matrix 8. The network of claim 7 wherein said crosspoints comprise a plurality of self-selecting switches electrically assembled into said cascaded matrices, means comprising a plurality of printed circuit cards for physically assembling said crosspoints into a compact device, each of said cards which carries a network inlet connection also adding all crosspoints necessary to give said inlet connection access to said network at no loss in grade of service, whereby the addition of cards bearing inlet connections automatically add all crosspoints required to give network availability to said inlet, and intercard cabling means for electrically joining the crosspoints physically mounted on said additional card into said electrical assembly.

9. An electrical switching network comprising a plurality of crosspoints distributed in full availability switching matrices, each of said matrices comprising a plurality of vertical and horizontal busses arranged with intersecting crosspoints, means associated with each of said crosspoints for opening or closing electrical circuits between the busses intersecting at said crosspoint, said matrices extending in cascaded stages between inlets and outlets of said network, means comprising a plurality of printed circuit cards for physically assembling said crosspoints into a physical network, intercard cabling means for electrically joining the crosspoints physically mounted on said additional card into said electrical assembly, there being at least four stages of cascaded matrices in said network with single path inter-stage linking between each matrix and every other matrix in the adjoining cascaded stage, the distribution of said crosspoints in the network being arranged in accordance with the following formula:

$$B=\frac{a-a_L}{K}$$

where $B$=Number of B matrices per 100-line unit; also the total number of B groups required.
$a$=Total 2-way traffic (in CCS) per 100-line unit
$a_L$=Total link traffic (in CCS) per 100-line unit
$K$=A constant (for all practical purposes) whose value is determined by the number of equipped verticals per primary matrix each of said cards which carries a network inlet connection also carrying the crosspoints necessary to give said inlet connection access to said network at no loss in grade of service, whereby the addition of a card bearing an inlet to the switching network automatically adds all crosspoints required to give service to said inlet, the last stages of said cascaded matrices being divided into A and B groups of crosspoints, means for extending originating connections from one of said A groups to said network outlets, means comprising both said A and B groups for extending terminating connections to said network outlets, means comprising certain of said printed circuit cards carrying crosspoints for extending said B groups to enlarge the switching capacity of said network, and means comprising other printed circuit cards carrying strip lines only for multiplying unused B group outlets back into said B group thereby providing connection points for said intercard cabling to facilitate later network growth when said extension cards are substituted for said multiplying cards.

10. An electrical switching network comprising a plurality of crosspoints distributed in full availability switching matrices, each of said matrices comprising a plurality of vertical and horizontal busses arranged with intersecting crosspoints, means associated with each of said crosspoints for opening or closing electrical circuits between the busses intersecting at said crosspoint, there being at least four stages of cascaded matrices in said network with single path interstage linking between each matrix in one stage and every other matrix in the adjoining stage, the distribution of said crosspoints in said networks being arranged in accordance with the following formula:

$$P(>0)=B''(N-1, S, s)+\sum_{k=1}^{S}B'(N-1, S-k, s)[q_3P_2^k+P_3]^A$$

where $s$=Average 2-way traffic *per line* in Erlangs $$s=\frac{P_1S}{N}$$

$N$=Number of "horizontals" per primary matrix ($N$=10)
B′ and B″() represent individual and cumulated terms, respectively, of the Binomial Probability Distribution
$S$ and $A$=Number of secondary and A matrices, respectively, per 100-line unit
$P(>0)$=Originating grade of service
$P_1$=Occupation probability between the primary and secondary paths
$P_2$=Occupation probability existing in secondary-to-A matrix path
$P_3$=Occupation probability existing in A matrix to B matrix interstage paths
$q_3=1-P_3$=idle probability between A matrix and B matrix interstage paths
$k$=a constant 11. The network of claim 10 wherein said crosspoints comprise a plurality of self-selecting switches electrically assembled into said cascaded matrices, means comprising a plurality of printed circuit cards for physically assembling said crosspoints into a compact array, each of said cards which carries a network inlet connection also adding the crosspoints necessary to give said inlet connection access to said network at no loss in grade of service, whereby the addition of cards bearing inlet connections automatically adds all crosspoints required to give network availability to said inlet, and intercard cabling means for electrically joining the crosspoints physically mounted on said additional card into said electrical assembly.

12. An electrical switching network comprising a plurality of crosspoints distributed in full availability switching matrices, each of said matrices comprising a plurality of vertical and horizontal busses arranged with intersecting crosspoints, means associated with each of said crosspoints for opening or closing electrical circuits between the busses intersecting at said crosspoint, said matrices extending in cascaded stages between inlets and outlets of said network, means comprising a plurality of printed circuit cards for physically assembling said crosspoints into a compact array, intercard cabling means for electrically joining the crosspoints physically mounted on said additional card into said electrical assembly, there being at least four stages of cascaded matrices in said network with single path inter-stage linking between each matrix and every other matrix in the next succeeding cascaded stage, the distribution of said crosspoints in the network being arranged in accordance with the following formula:

$$P(>0)=B''(N-1, S, s)+\sum_{k=1}^{S}B'(N-1, S-k, s)[q_3P_2^k+P_3]^A$$

where $s$=Average 2-way traffic *per line* in Erlangs $$s=\frac{P_1S}{N}$$

$N$=Number of "horizontals" per primary matrix ($N$=10)
B′ and B″() represent individual and cumulated terms, respectively, of the Binomial Probability Distribution
$S$ and $A$=Number of secondary and A matrices, respectively, per 100-line unit
$P(>0)$=Originating grade of service
$P_1$=Occupation probability between the primary and secondary paths
$P_2$=Occupation probability existing in secondary-to-A matrix path
$P_3$=Occupation probability existing in A matrix to B matrix interstage paths
$q_3=1-P_3$=idle probability between A matrix and B matrix interstage paths
$k$=a constant each of said cards which carries a network inlet connection also carries the crosspoints necessary to give said inlet connection access to said network at no loss in grade of service, whereby the addition of a card bearing an inlet to the switching network automatically adds all crosspoints required to give service to said inlet, the last stages of said cascaded matrices being divided into A and B groups of crosspoints, means for extending originating connections from one of said A groups to said network outlets, means comprising both said A and B groups for extending terminating connections to said network outlets, means comprising certain of said printed circuit cards carrying crosspoints for extending said B groups to enlarge the switching capacity of said network, and means comprising other printed circuit cards carrying strip lines only for multiplying unused B group outlets back into said B group thereby providing connection points for said intercard cabling to facilitate later network growth when said extension cards are substituted for said multiplying cards.

13. An electrical switching network comprising a plurality of cascaded full availability switching stages, each of said stages comprising a plurality of inlets and outlets and means including a switching point in every possible path between each of said inlets and outlets, there being at least four cascaded stages with single path inter-stage linking means for connecting each stage to every next succeeding stage, and means for providing a given grade of service between a specific inlet and a specific outlet of said cascaded stages, said last named means interconnecting network components in accordance with the following formula:

$$P(>0)=B''(N-1,\ S,\ s)+\sum_{k=1}^{S}B'(N-1,\ S-k,\ s)\ [q_3P_2^{k}+P_3]^{A}$$

where $s$=Average 2-way traffic *per line* in Erlangs $$s=\frac{P_1S}{N}$$

$N$=Number of "horizontals" per primary matrix ($N=10$)

B′ and B″() represent individual and cumulated terms, respectively, of the Binomial Probability Distribution $S$ and $A$= Number of secondary and A matrices, respectively, per 100-line unit $P(>0)$=Originating grade of service $P_1$=Occupation probability between the primary and secondary paths $P_2$=Occupation probability existing in secondary-to-A matrix path $P_3$=Occupation probability existing in A matrix to B matrix interstage paths $q_3=1-P_3$=idle probability between A matrix and B matrix interstage paths $k$=a constant

14. The network of claim 13 wherein said components comprise a plurality of self-selecting crosspoints electrically assembled into matrices, said means comprising a plurality of printed circuit cards for physically assembling said crosspoints into a compact device, means whereby each of said cards carrying a network inlet also carries the crosspoints necessary to maintain the distribution set forth in said formula, thus the addition of a card bearing an inlet to the switching network assembly automatically adds all crosspoints required by said formula, and intercard cabling means for electrically joining the crosspoints physically mounted on said additional card into said electrical assembly.

15. An electrical switching network comprising a plurality of cascaded full availability switching stages, each of said stages comprising a plurality of inlets and outlets and means including a switching point in every possible path between each of said inlets and outlets, there being at least four cascaded stages with single path inter-stage linking means for connecting each stage to every next succeeding stage, and means for providing a given grade of service between a specific inlet and a specific outlet of said cascaded stages, said last named means interconnecting network components in accordance with the following formula:

$$B=\frac{a-a_L}{K}$$

where $B$=Number of B matrices per 100-line unit; also the total number of B groups required.

$a$=Total 2-way traffic (in CCS) per 100-line unit $a_L$=Total link traffic (in CCS) per 100-line unit $K$=A constant (for all practical purposes) whose value is determined by the number of equipped verticals per primary matrix

16. The network of claim 15 wherein said components comprise a plurality of self-selecting crosspoints electrically assembled into matrices, said means comprising a plurality of printed circuit cards for physically assembling said crosspoints into a compact device, means whereby each of said cards carrying a network inlet also carries the crosspoints necessary to maintain the distribution set forth in said formula, thus the addition of a card bearing an inlet to the switching network assembly automatically adds all crosspoints required by said formula, and intercard cabling means for electrically joining the crosspoints physically mounted on said additional card into said electrical assembly.

References Cited by the Examiner

UNITED STATES PATENTS

| | | | |
|---|---|---|---|
| 3,041,409 | 6/1962 | Zarouni | 179—2 |
| 3,106,615 | 10/1963 | Spjeldnes | 179—18 |
| 3,185,898 | 5/1965 | Ehlschlager | 179—18 |

KATHLEEN H. CLAFFY, *Primary Examiner.*

L. A. WRIGHT, *Assistant Examiner.*